United States Patent
Kägi et al.

(10) Patent No.: US 12,017,716 B2
(45) Date of Patent: Jun. 25, 2024

(54) VEHICLE CONFIGURATOR

(71) Applicant: CREATIVE INNOVATIONS AG, Zumikon (CH)

(72) Inventors: Peter Kägi, Hombrechtikon (CH); Frank M. Rinderknecht, Küsnacht (CH)

(73) Assignee: CREATIVE INNOVATIONS AG, Zumikon (CH)

( * ) Notice: Subject to any disclaimer, the term of this patent is extended or adjusted under 35 U.S.C. 154(b) by 0 days.

(21) Appl. No.: 17/627,659

(22) PCT Filed: Jul. 1, 2020

(86) PCT No.: PCT/EP2020/068584
§ 371 (c)(1),
(2) Date: Jan. 15, 2022

(87) PCT Pub. No.: WO2021/008874
PCT Pub. Date: Jan. 21, 2021

(65) Prior Publication Data
US 2022/0274658 A1 Sep. 1, 2022

(30) Foreign Application Priority Data
Jul. 16, 2019 (CH) .................................. 00916/19

(51) Int. Cl.
*B62D 65/02* (2006.01)
*B62D 27/06* (2006.01)
*B62D 63/04* (2006.01)

(52) U.S. Cl.
CPC ........... *B62D 65/022* (2013.01); *B62D 27/06* (2013.01); *B62D 63/04* (2013.01)

(58) Field of Classification Search
CPC ...... B62D 65/022; B62D 27/06; B62D 63/04; B62D 24/00; B62D 63/02; B62D 33/077;
(Continued)

(56) References Cited

U.S. PATENT DOCUMENTS 2,822,055 A   2/1958 Johann
9,873,365 B2 * 1/2018 Uetake .................... E21C 41/16
(Continued)

FOREIGN PATENT DOCUMENTS

DE   102017122704 A1   4/2019
EP           622288 A1 * 11/1994 ............ B60P 1/6436
(Continued)

OTHER PUBLICATIONS

International Search Report dated Sep. 29, 2020 for International Application No. PCT/EP2020/068584.
(Continued)

*Primary Examiner* — Pinel E Romain
(74) *Attorney, Agent, or Firm* — TAROLLI, SUNDHEIM, COVELL & TUMMINO L.L.P.

(57) ABSTRACT

The invention relates to a vehicle configurator (100) comprising a chassis (1), a transport structure (2) and one or more transfer means (41). The one or more transfer means are essentially arranged in a displacement plane. The vehicle configurator (100) is designed such that the transport structure (2) is displaceable with the one or more transfer means (41) in the displacement plane for loading or unloading the transport structure (2) from the chassis (1).

18 Claims, 6 Drawing Sheets

(58) Field of Classification Search
CPC ......... B62D 65/04; B62D 21/12; B60P 3/423;
B60P 1/52; B60P 3/42
USPC .............................. 296/35.3, 193.03, 193.04
See application file for complete search history.

(56) References Cited

U.S. PATENT DOCUMENTS

| | | | |
|---|---|---|---|
| 9,919,798 B2* | 3/2018 | Haertel | .................... B64D 9/00 |
| 10,359,783 B2* | 7/2019 | Williams | ............. G05D 1/0293 |
| 10,449,887 B2* | 10/2019 | Kato | ........................ B60P 1/52 |
| 11,001,186 B2* | 5/2021 | Bryant | .................... B60P 1/649 |
| 11,364,833 B2* | 6/2022 | Berghammer | ......... B65G 65/00 |
| 11,390,504 B2* | 7/2022 | Bastian, II | .......... B66F 9/07568 |
| 2012/0068951 A1* | 3/2012 | Venkatasubramanian | ................... G03B 21/14 353/121 |
| 2018/0104839 A1* | 4/2018 | Jeffers | ..................... B26D 5/12 |
| 2018/0133074 A1 | 5/2018 | Delise | |
| 2019/0196479 A1* | 6/2019 | Kaneko | .................. G06Q 50/00 |
| 2019/0299732 A1* | 10/2019 | Smith | ..................... B60R 25/25 |
| 2021/0101613 A1* | 4/2021 | Claesson | ................ B60P 3/423 |
| 2021/0237815 A1* | 8/2021 | Yoshikawa | .......... B62D 65/022 |

FOREIGN PATENT DOCUMENTS

| | | |
|---|---|---|
| FR | 1510022 A | 1/1968 |
| JP | 2011235689 A | 11/2011 |
| KR | 20170136529 A | 12/2017 |

OTHER PUBLICATIONS

European Office Action dated Sep. 7, 2023. Communication pursuant to Article 94(3) EPC. English translation not provided. pp. 1-6.

* cited by examiner

VEHICLE CONFIGURATOR

RELATED APPLICATIONS

The present application is a U.S. National Stage application under 35 USC 371 of PCT Application Serial No. PCT/EP2020/068584, filed on 1 Jul. 2020; which claims priority from CH Patent Application No. 00916/19, filed 16 Jul. 2019, the entirety of both of which are incorporated herein by reference.

FIELD OF THE INVENTION

The invention relates to a vehicle configurator, a transport body for the vehicle configurator, a chassis and a method for moving a transport body in a vehicle configurator.

BACKGROUND

Nowadays, chassis are equipped with electronic components that are sensitive to expiry times. This means, for example, that an installed vehicle navigation system or infotainment system is already outdated by innovations after a short time and is technologically obsolete compared to them. A hardware update of these components often makes little sense from an economic point of view, which leads to the entire vehicle being replaced by a newer one after a short time.

In order to make the best use of the short life of a vehicle, the vehicle should be used as often as possible. High utilization of a vehicle can be aimed at in particular by modular vehicle systems, such as those described for example in US 2018/0050626 A1. In this context, a chassis of a vehicle can be connected in a modular manner to different passenger and/or goods transport cells, so that different possibilities of use arise.

However, these systems often have the disadvantage that replacement of the passenger and/or goods transport cells is only possible with a great deal of effort.

On the other hand, the rapidly increasing global demand for delivery of online orders requires new, innovative and more efficient approaches. Modular vehicle systems can be used to implement such solutions.

PRESENTATION OF THE INVENTION

The present invention is therefore based on the task of providing a modular driving system which is advantageous over the above-mentioned known driving systems.

In this regard, a first aspect of the invention relates to a vehicle configurator comprising a chassis, a transport body and one or more transfer component(s). The one or more transfer component(s) are arranged substantially in a displacement plane, or form a displacement plane. The displacement plane is in particular a virtual plane in which the transport body can be displaced.

Essentially means in particular that even slight deviations of the arrangement of the one or more transfer component(s) in a plane are taken into account. In particular, the one or more transfer component(s) form this displacement plane with their support points.

The vehicle configurator is designed in such a way that the transport body can be moved in the displacement plane by means of the one or more transfer component(s) for loading or unloading the transport body from the chassis.

The vehicle configurator is particularly suitable as a configurator for vehicles in public transport, in particular for the transport of passengers or goods, especially for vehicles which travel autonomously in public transport.

In particular, the vehicle is a roadworthy vehicle, in particular an autonomous roadworthy vehicle.

In a further embodiment, the vehicle configurator may comprise a station, wherein the vehicle configurator is configured such that the transport body is displaceable between the chassis and the station. Advantageously, the transport body or the transport bodies displaceable between the chassis and the station substantially in the displacement plane in which the transfer component(s) are substantially arranged.

In an advantageous embodiment, the station may be fixed or may be movable. Fixedly mounted means that the station is firmly anchored at one location. Movable means the station can be moved from one place to another with few means, for example because it has wheels or castors or can be easily transported, pushed or moved from one place to another.

In particular, the vehicle configurator may be configured such that the chassis has a support surface for supporting the transport body.

In particular, the vehicle configurator could be configured such that a support surface of the chassis and a support surface of the station are substantially aligned in a plane, such that the transport body could be moved between these support surfaces.

The support surface of the chassis and the support surface of the station are preferably aligned so that they lie more or less in one plane.

In this case, the two supporting surfaces can also lie in parallel planes which are spaced apart from one another by a distance a of approx. 1 cm≤a≤5 cm or approx. 1 cm≤a≤20 cm perpendicular to the extension of the planes, as long as the transport body can still be displaced in at least one direction, for example from the supporting surface of the station to the supporting surface of the chassis.

In a further embodiment, the vehicle configurator may comprise a further chassis, wherein the vehicle configurator is configured such that the transport body is slidable between the chassis and the further chassis.

Advantageously, the direction of displacement of the transport body is lateral to the longitudinal axis of the chassis.

In relation to a Cartesian coordinate system, a displacement in lateral direction to the longitudinal axis of the chassis means in particular that the direction of the displacement is substantially perpendicular (in X-direction) to one longitudinal direction of the chassis (Y-direction) and perpendicular to a height (Z-direction) of the chassis. Substantially in the X-direction may mean that a deviation of the displacement of ±20° perpendicular to the Y-direction or Z-direction is also included.

In a further embodiment, the displacement may be in the direction of the longitudinal axis of the chassis.

In particular, in an embodiment with two transport bodies, a first transport body can be displaced laterally with respect to the longitudinal axis of the chassis and a second transport body can be displaced in the direction of the longitudinal axis of the chassis.

In particular, the transport body is already in its end position after being moved. It can therefore be brought to its end position by a parallel shift alone and does not have to be rotated.

In particular, the fact that the transport body is displaceable means that this is possible if the chassis is located next to or close to the station in such a way that the one or more transfer component(s) can displace the transport body from station to chassis or vice versa. Since the transport body is preferably a relatively rigid construction, it is also possible to displace it over a certain distance between the station and the chassis.

In a further embodiment of the vehicle configurator, the chassis and/or the further chassis and/or the station each have a receptacle which is adapted to the transport body. Adaption means that the receptacle is formed as a negative shape of a part of the shape of the transport body, so that in particular all undersides with which the transport body is in contact with the station and/or the chassis and/or the further chassis are in contact with the receptacle of the station and/or the chassis. In particular, the adapted receptacle serves to ensure that the transport body rests better on the station or the chassis. In particular, the receptacle may also comprise fastening component(s) of the transport body. These fastening component(s) may, for example, be in the form of bolts, hooks or straps for releasably fastening the transport body to the station or chassis.

In a further embodiment, the one or more transfer component(s) are formed as components of the chassis, as components of the further chassis and/or as components of the transport body and/or as components of the station. In particular, therefore, the one or more transfer component(s) may be present only on the station, or only on the chassis, or only on the transport body. Furthermore, combinations would also be possible, such that the one or more transfer component(s) occur, for example, at the station and at the chassis, with the transport body having no transfer component(s). Further, it would be possible that the one or more transfer component(s) only occurs at the transport body and not at the station or chassis. Or that the one or more transfer component(s) occurs at the transport body and the station or the chassis.

In a further embodiment, the transfer component(s) may be arranged at the bottom of the transport body or at the top of the transport body. In a further embodiment, the transfer component(s) can be arranged on the chassis so that the transport body comes to rest on or under the transfer component(s) after loading the chassis.

In a further embodiment, the one or more transfer component(s) are advantageously disposed within a support surface of the station and/or within a support surface of the chassis, such that the transport body comes to rest directly thereon and the transfer component(s) act directly on the transport body to move it.

In particular, the one or more transfer component(s) can move the transport body from the station to the chassis only if the chassis and the station are within the respective effective range of the one or more transfer component(s) of the station and/or the chassis. That is, the chassis and station should be at a certain minimum distance, that is, within an effective range of the one or more transfer component(s), so that the transport body can be moved. The effective range, i.e., the distance at which the transport body can be moved beyond the chassis, depends on the one hand on the one or more transfer component(s) and on the other hand on the shape and weight, or position of the center of gravity, of the transport body.

Advantageously, the one or more transfer component(s) are at least partially formed as bearings with wheels, rollers or balls, as a conveyor belt, as a chain transport system or as a sliding surface or a combination thereof. In this regard, the bearings or the conveyor belt are in particular configured such that their transport direction is laterally aligned with the longitudinal axis of the chassis. In particular, the sliding plane has a coating of a material which has a small coefficient of friction with the surface sliding thereon. The sliding plane, for example the supporting surface of the station, may for example be coated with Teflon, an underside of the transport body being configured to slide well on the coating.

In a further embodiment, the transfer component(s) may also be configured as so-called "omniwheels", all-side wheels.

In a further embodiment, the station could also be supported on wheels, in particular all-round wheels.

The one or more transfer component(s) can be active or passive, i.e., they can either be actively operated, i.e., equipped with a drive, or driven by a user moving the transport body.

In a further embodiment, the station and/or the chassis and/or the further chassis may be adjustable in height. Thus, for example, the height of a possible supporting surface of the station and/or a supporting surface of the chassis or the further chassis can be adjusted in the Z-direction. This adjustability serves to bring in particular the possible supporting surfaces to substantially one plane, the displacement plane, so that the transport body can be displaced.

In another embodiment of the vehicle configurator, the station and/or the chassis may comprise a guiding device. This may be used to guide the transport body during displacement. In particular, this guiding device is formed as a rail or as a pair of rails. Preferably, the guiding device is formed as a pair of rails that is funnel-shaped on the station in the direction of the chassis. That is, a distance between the rails of the pair of rails becomes smaller in the direction of the chassis, but remains large enough for the transport body to pass between the rails. Such a guide device makes it easier to move the transport body, as it guides the transport body to the right place for loading onto the chassis.

In another advantageous embodiment of the vehicle configurator, a bridge is arranged between the station and the chassis to facilitate loading and unloading of the chassis. In particular, the bridge can bridge small height differences between the station and the chassis for easier loading and unloading of the transport body.

A further advantageous embodiment of the vehicle configurator comprises a connection between the chassis and the transport body, for exchanging data and/or for power supply. The connection may in particular be a cable connection or a wireless, for example inductive, connection.

A further embodiment of the vehicle configurator comprises a set of transport bodies. Preferably, the set comprises at least one transport body for transporting persons and one transport body for transporting goods. Furthermore, the set may comprise several transport bodies for transporting persons and goods, whereby a different number of persons may be transported therewith. Furthermore, the set may also comprise different bodies for transporting goods, which are designed for different goods, for example bodies for transporting packages.

In a further advantageous embodiment, the transport body may be intrinsically modular comprising one or more transport modules. In particular, the individual transport modules of the transport body may be connected or partially connected. In particular, the individual transport modules of the transport body may be loaded or unloaded individually from the transport body. A further advantageous embodiment of the vehicle configurator may comprise two, three, four, five or six transport bodies.

In particular, a second, third, fourth, fifth or sixth transport body may be designed as a transport wagon. Furthermore, a second, third, fourth, fifth or sixth transport body may also be designed for transporting passengers or goods.

In a further embodiment, the transport body may be secured to the chassis by means of at least one fastening element. Preferably, the transport body is fastened by at least three mechanical fastening elements. Preferably, the at least one fastening component(s) is configured in such a way that it does not impede the displacement of the transport body, for example it is retractable, for example it is retractable in a support surface of the transport body.

In particular, the fastener may be configured to be movable, rotatable, or tiltable in the x, y, and z directions.

A second aspect of the invention relates to a transport body for the vehicle configurator according to the first aspect of the invention.

A third aspect of the invention relates to a chassis comprising one or more transfer component(s) arranged substantially in a displacement plane, or forming a displacement plane. The chassis is configured such that a transport body comprising the one or more transfer component(s) is displaceable in the displacement plane, for loading or unloading the transport body from the chassis.

Preferably, the chassis is configured such that a direction of displacement of the transport body is lateral to the longitudinal axis of the chassis.

A fourth aspect of the invention relates to a method of moving a transport body in a vehicle configurator. The vehicle configurator includes a chassis, a transport body and one or more transfer component(s). The one or more transfer component(s) are arranged substantially in a displacement plane, or respectively form a displacement plane. The method comprises the step of moving the transport body with the one or more transfer component(s) in the displacement plane, for loading and unloading the transport body from the chassis.

Another advantageous method relates to a vehicle configurator having a station, comprising the step of moving the transport body between the chassis and the station.

A further advantageous method may further comprise the steps of aligning the station and the chassis substantially horizontally, in particular by means of a height-adjustable support surface of the chassis and/or the station.

The embodiments and features described in the description are also disclosed herein in combination. Further advantageous embodiments are described below.

BRIEF DESCRIPTION OF THE DRAWINGS

Further embodiments, advantages and applications of the invention will be apparent from the dependent claims and from the description which now follows with reference to the figures. Thereby showing:

WAY(S) OF CARRYING OUT THE INVENTION

Figure 1A:
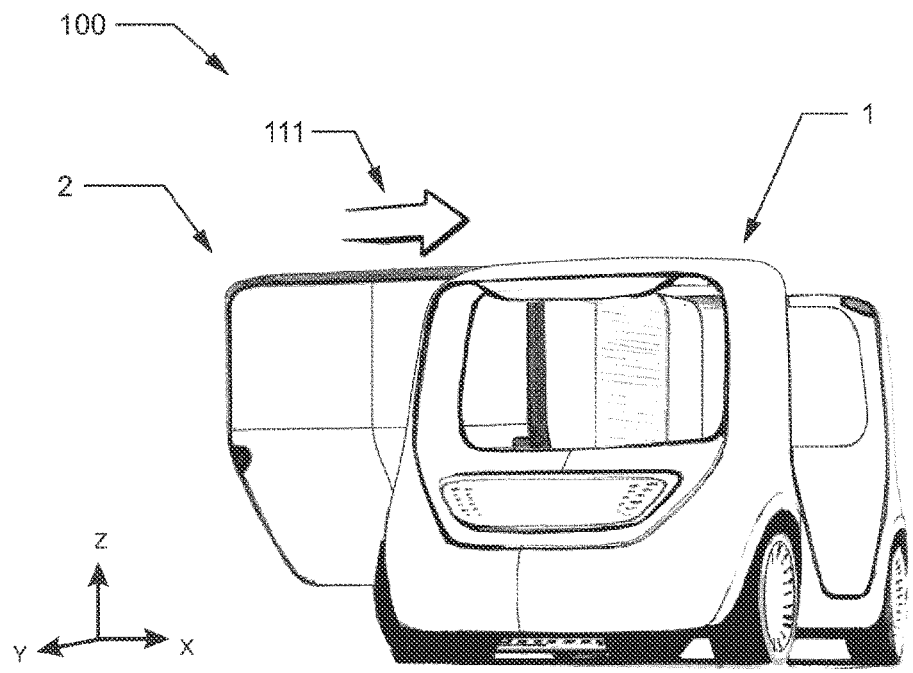
FIGS. 1a and 1b each show a vehicle configurator according to different embodiments of the invention.

FIG. 1a schematically shows an embodiment of a vehicle configurator 100 comprising a chassis 1 and a transport body 2. Furthermore, the vehicle configurator 100 comprises one or more transfer component(s) which are not visible in the figure, but which may be attached to the chassis 1 or the transport body 2. The one or more transfer component(s) are arranged substantially in a virtual displacement plane. The transport body 2 is displaceable in this displacement plane, for loading and unloading the transport body 2 from the chassis 1.

Figure 1B:
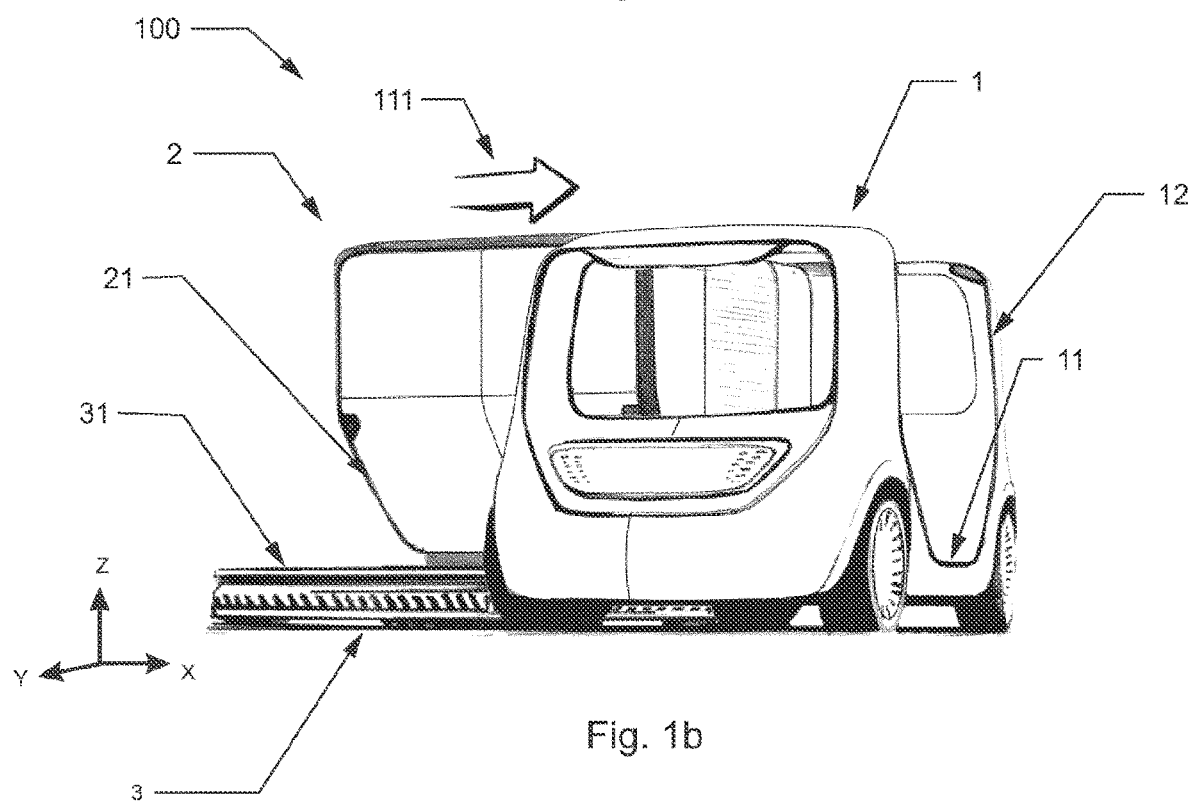

FIG. 1b schematically shows a further embodiment of a vehicle configurator 100 comprising a chassis 1, a transport body 2 and additionally a station 3. Furthermore, the vehicle configurator 100 comprises several transfer component(s) which are not visible in the figure, but which may be attached to the station 3, the chassis 1 or the transport body 2. The chassis 1 and the station 3 may each be configured with a support surface 11, 31 for the transport body 2. The one or more transfer component(s) are arranged substantially in a virtual displacement plane. The transport body 2 is displaceable in this displacement plane between the chassis 1 and the station 2, for loading and unloading the transport body 2 from the chassis 1.

Station 2 can be fixed or can be movable.

Preferably, the vehicle configurator 100 is configured such that the support surface 11 of the chassis 1 and the support surface 31 of the station 3 are aligned in a substantially planar manner, i.e., are arranged at substantially the same height (in the Z-direction).

The direction of displacement of the transport body 2 is preferably lateral (in the X-direction) to the longitudinal axis of the chassis 1 (in the Y-direction), as indicated by the illustrated arrow 111.

Furthermore, the chassis 1 and/or the station 2 can each comprise a receptacle for the transport body 2, which receptacle is in particular adapted for the transport body 2. In FIG. 1, such a receptacle 12 of the chassis 1 is illustrated. This is designed to be adapted for the transport body 2, that is to say that in particular the rounded corners 21 of the transport body 2 are adapted to the receptacle 12 of the chassis 1.

Figure 2:
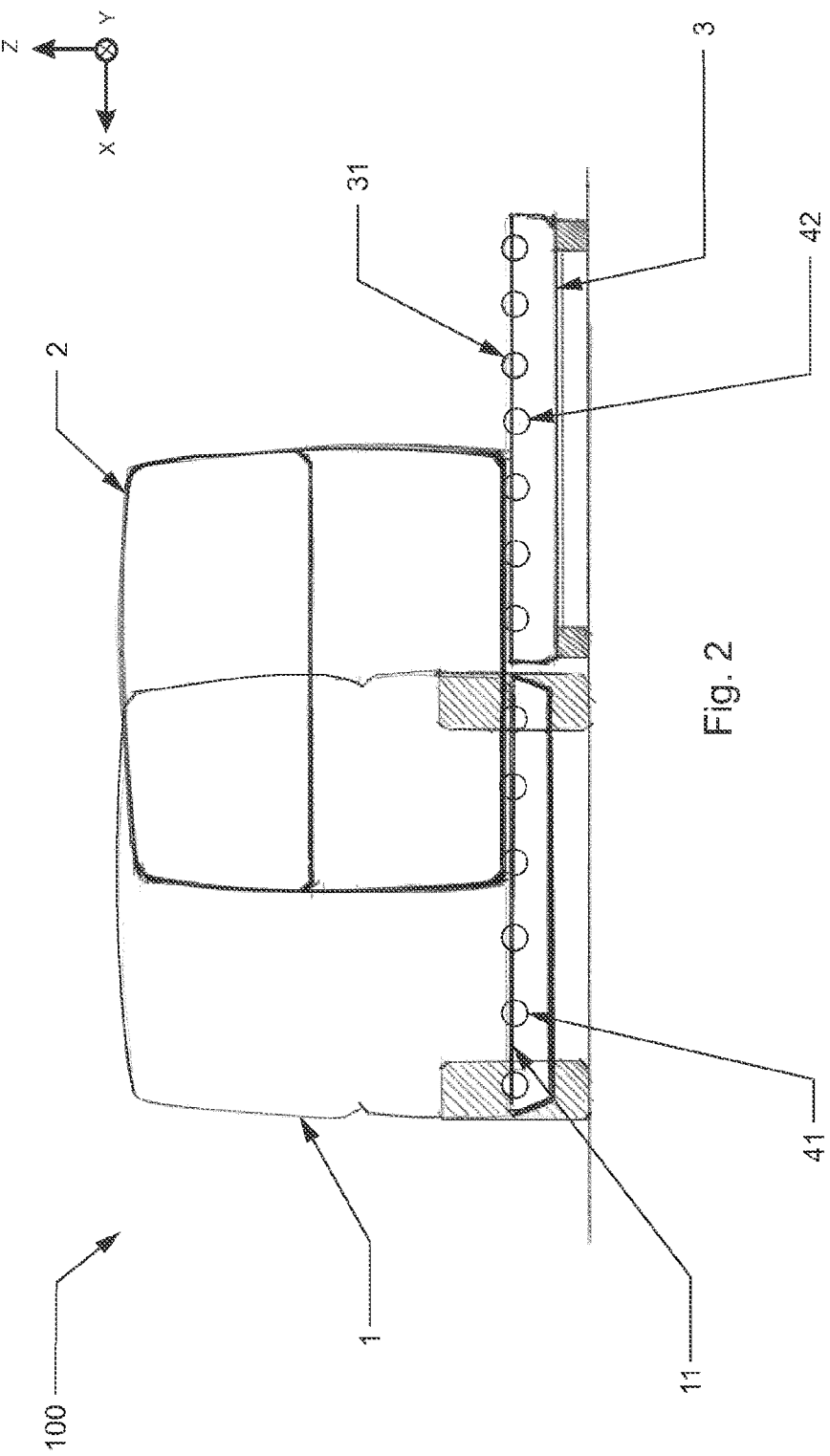
FIG. 2 shows a vehicle configurator according to a further embodiment of the invention.

FIG. 2 shows a cross-section of a vehicle configurator 100 according to a further embodiment of the invention comprising a chassis 1, a transport body 2 and a station 3. Furthermore, the vehicle configurator 100 comprises a plurality of transfer component(s) 41, 42 for moving the transport body 2. The transfer component(s) 41, 42 of this embodiment are designed as rollers, or roller bearings, of the station 3 and the chassis 1, which move the transport body 2 back and forth between station 3 and chassis 1. The transfer component(s) 41, 42 could also be formed as bearings made of balls, as a conveyor belt, rollers, conveyor belts, chain transport system or as a sliding plane.

The chassis 1 and the station 3 may each be configured with a support surface 11, 31 for the transport body 2. The vehicle configurator 100 is then configured such that the support surface 11 of the chassis 1 and the support surface 31 of the station 3 are aligned in a substantially planar manner, i.e., are arranged at substantially the same height (in the Z-direction). The transport body 2 would then be movable between the support surface 13 of the chassis 1 and the support surface 31 of the station 3 by the transfer component(s) 41, 42.

Advantageously, the direction of displacement of the transport body 2 is lateral (in the X-direction) to the longitudinal axis of the chassis 1 (in the Y-direction).

Transfer component(s) 41, 42 are formed as components of chassis 1 and station 3 in the embodiment shown in FIG. 2. However, they can also be components of the station 3 or of the chassis 1 only, or could also be formed on the underside of the transport body 2.

In order for the chassis 1 and station 3 to be substantially even level, the station 3 and/or chassis 1 may be adjustable in height relative to the ground on which they stand. This applies to all embodiments.

The chassis 1 and/or station 3 may have a wired or wireless connection to the transport body, for power and data supply.

Figure 3:
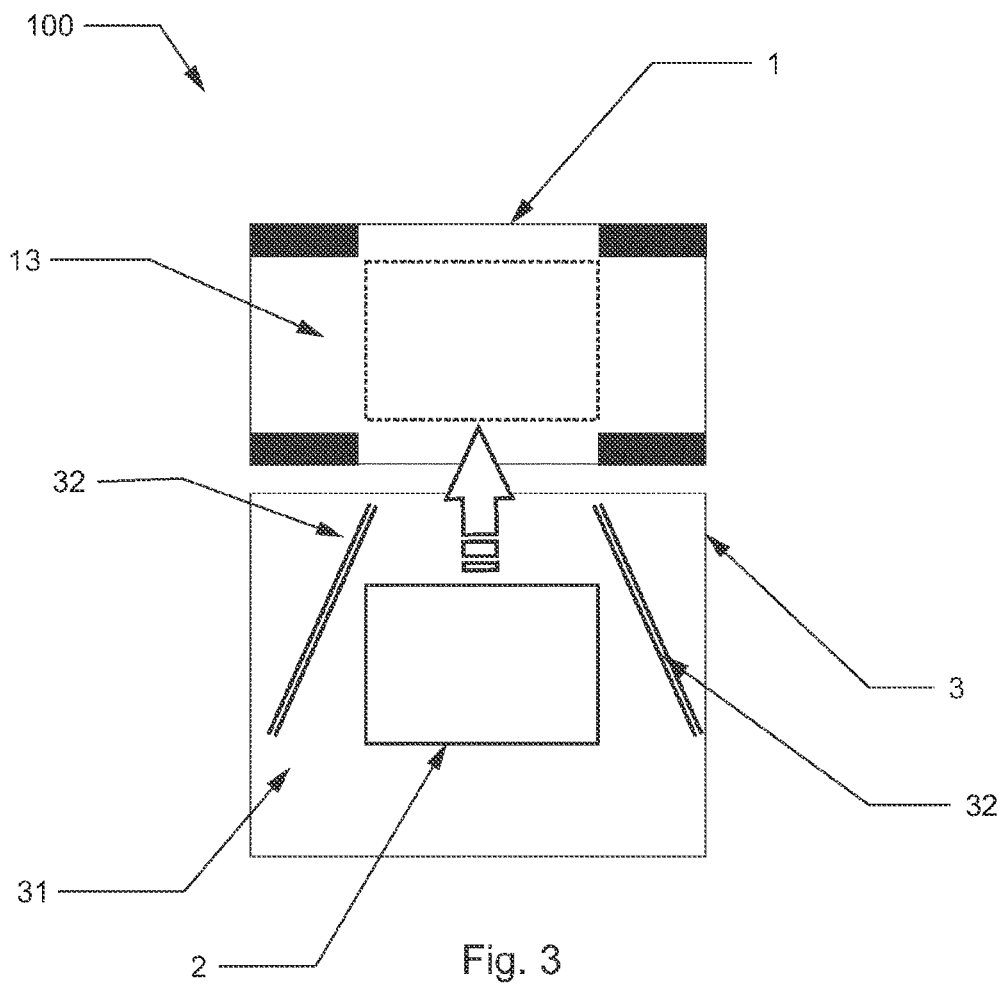
FIG. 3 shows a schematic cross-section from a top view of the vehicle configurator according to an embodiment of the invention.

FIG. 3 shows a schematic plan view of a cross-section of a further embodiment of the vehicle configurator 100 of FIG. 1 or FIG. 2. In addition to the features of the vehicle configurator 100 described above, the station 3 of this embodiment comprises a guiding device 32, for guiding the transport body 2 during displacement, in particular on a support surface 31 of the station 3. The guiding device 32 is designed in such a way that it guides the transport body 2 in the direction of the chassis 1. In particular, the guiding device 32 may be configured as sleepers which prevent lateral movement of the transport body 3, perpendicular to the direction of displacement of the transport body 2. In particular, the sleepers may be arranged in a funnel shape in the direction of the chassis 2 for this purpose.

The vehicle configurator 100 according to one of the embodiments as shown in FIGS. 1 to 3 may also comprise, in a further embodiment, a plurality of transport bodies 2. Embodiments of these further transport bodies 2 are shown schematically in FIG. 3 and FIG. 4, and are explained in the following.

Figure 4:
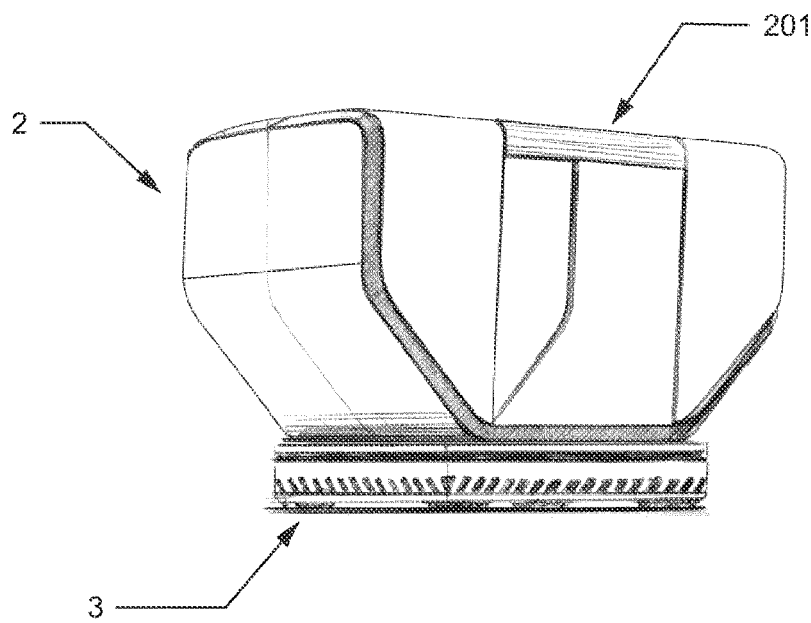
FIG. 4 shows a transport body on a station according to a further embodiment of the invention.

FIG. 4 shows an embodiment of a transport body 2, which is designed in particular for transporting goods. For this purpose, sliding doors 201 are attached to the sides, which can be used for loading and unloading of transport body 2.

Figure 5:
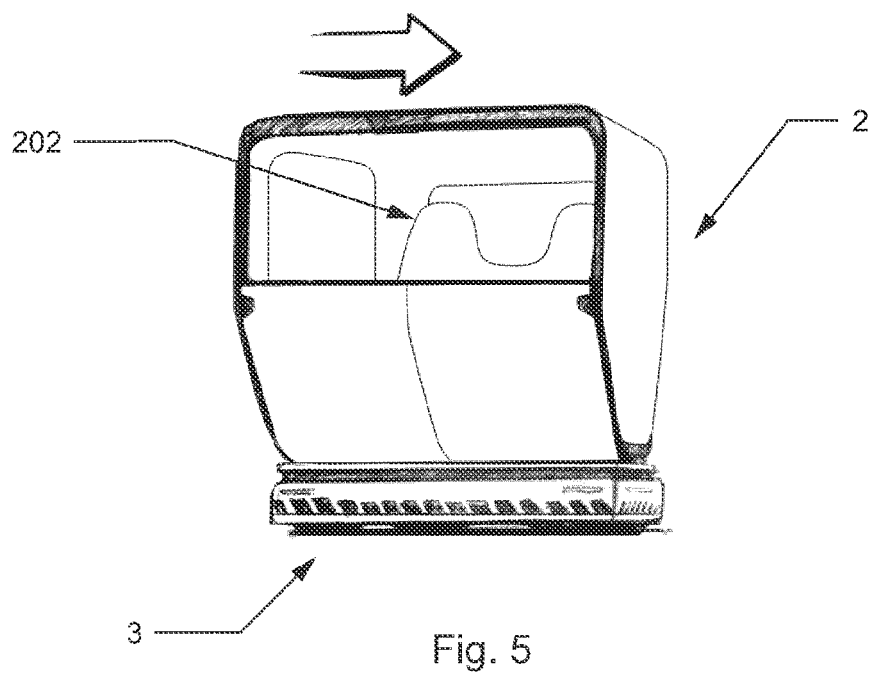
FIG. 5 shows a transport body on a station according to a further embodiment of the invention.

FIG. 5 shows a further embodiment of a transport body 2, which is designed in particular for transporting passengers. For this purpose, this transport body 2 comprises chairs 202 for the passengers.

In particular, the vehicle configurator 100 may comprise a set of different transport bodies 2, which may be moved by the one or more transfer component(s) as required.

Figure 6:
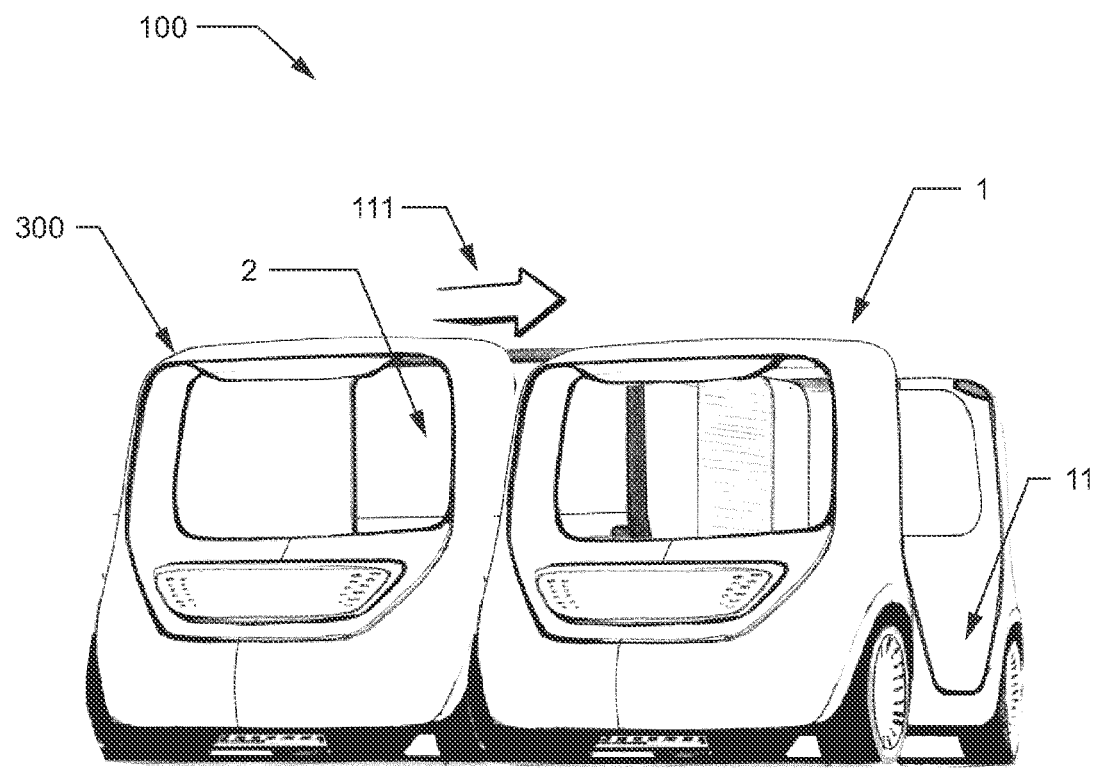
FIG. 6 shows a vehicle configurator according to a further embodiment of the invention.

FIG. 6 shows a further embodiment of the vehicle configurator, wherein the configurator comprises a further chassis 300. This embodiment is configured such that the transport body 2 is movable between the chassis 1 and the further chassis 300.

Figure 7:
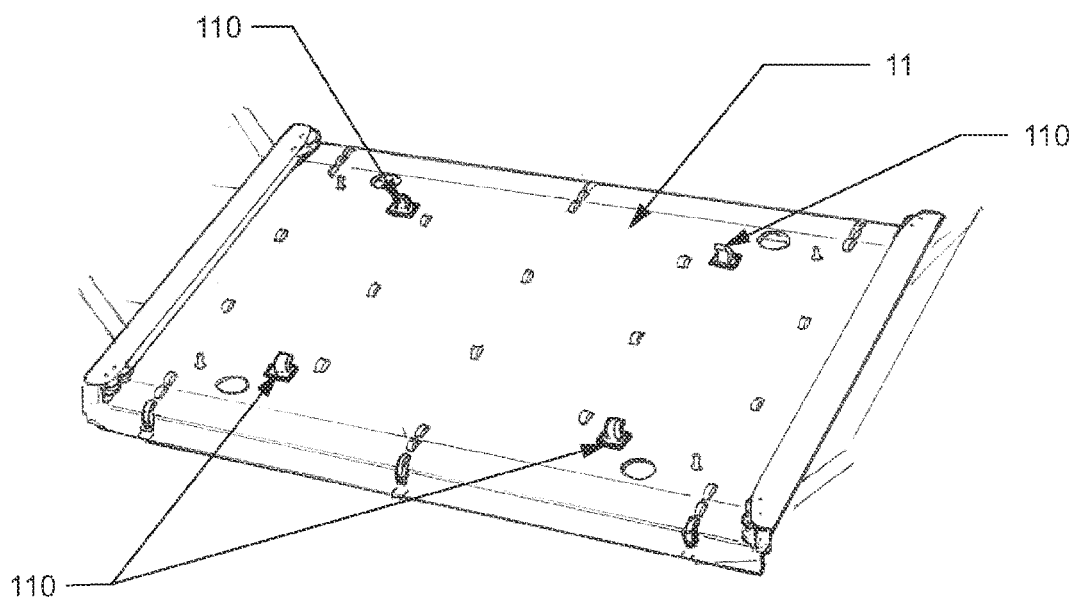
FIG. 7 shows fastening component(s) for fastening the transport body to the chassis.

FIG. 7 shows an embodiment of the chassis, which comprises fastening component(s) 110 for fastening the transport body 2. The chassis 1 may be formed with a supporting surface 11. In an advantageous embodiment, fastening component(s) 110 are arranged on the supporting surface 11, in particular four fastening component(s), which are retractable. Retractable means that the fastening component(s) 110 are retractable in the support surface 11 in such a way that they do not impede the displacement process of the transport body 2. In further embodiments, the fastening component(s) 110 may also be displaceable, rotatable or tiltable.

Figure 8:
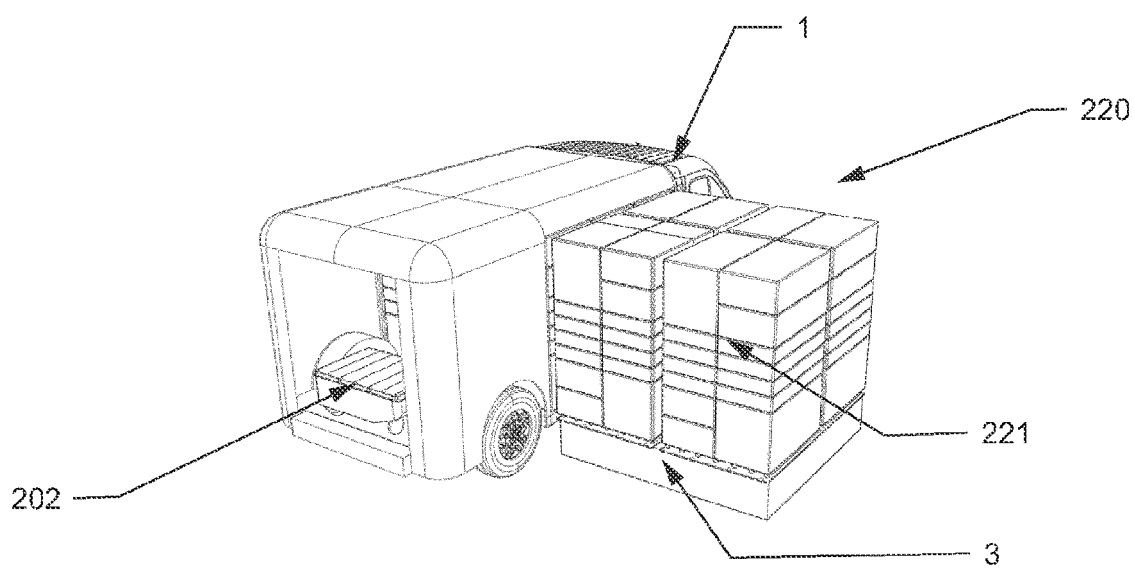
FIG. 8 shows a vehicle configurator according to a further embodiment of the invention.

FIG. 8 shows another embodiment of the vehicle configurator 100 comprising a chassis 1 and two transport bodies 220, 202 and transfer component(s) 41. The first transport body 220 comprises transport modules 221, which may be interconnected or partially interconnected. The transport modules 221 are of different sizes, respectively different volumes. Together they form the first transport body 220.

As shown in FIG. 8, chassis 1 may in particular comprise a second transport body 202. Here, this second transport body 202 is designed as a transport trolley. This transport trolley is used in particular for transporting transport modules 221, for example if no station is available or in order to bring the transport modules 221 to the station.

FIG. 1a also illustrates the procedure for displacing a transport body 2 in a vehicle configurator 100, which is indicated by the arrow 111 in the direction of displacement.

FIG. 1b shows a further embodiment of this method with a vehicle configurator, which also comprises a station 3. Here, too, the arrow 111 indicates the direction of displacement.

While preferred embodiments of the invention are described in the present application, it should be clearly noted that the invention is not limited thereto and may be carried out in other ways within the scope of the following claims.

The invention claimed is:

1. Vehicle configurator comprising
a chassis,
at least one transport body,
one or more transfer component(s), the one or more transfer component(s) being substantially arranged in a sliding plane,
wherein the vehicle configurator is configured for
sliding the transport body in the sliding plane by the one or more transfer component(s), for at least one of loading and unloading the transport body from the chassis,
wherein the chassis is a road vehicle,
wherein the vehicle configurator is configured such that a sliding direction of the transport body is lateral to a longitudinal axis of the chassis,
wherein the vehicle configurator is configured for at least one of loading and unloading the transport body along the sliding direction, and
wherein the chassis comprises a guide component for guiding the at least one transport body during movement along the sliding direction.

2. The vehicle configurator according to claim 1, comprising a station, wherein the vehicle configurator is configured such that the transport body is slidable between the chassis and the station.

3. The vehicle configurator according to claim 1, comprising an additional chassis, wherein the vehicle configurator is configured such that the transport body is slidable between the chassis and the additional chassis.

4. The vehicle configurator according to claim 3, wherein at least one of the chassis and the additional chassis comprises a seat for the transport body, which seat is accurately fitting the transport body.

5. The vehicle configurator according to claim 3,
wherein the one or more transfer component(s) are formed as components of at least one of the chassis, the additional chassis, the transport body, and the station.

6. The vehicle configurator according to claim 1, wherein the one or more transfer component(s) comprise at least one of a wheel bearing, a roller bearing, a ball bearing, a conveyor belt, a chain transport system, and a sliding plane.

7. The vehicle configurator according to claim 3, wherein at least one of the chassis and the additional chassis is adjustable in height.

8. The vehicle configurator according to claim 1 comprising a set of transport bodies, including at least one transport body for passenger transport and at least one transport body for transport of goods.

9. The vehicle configurator according to claim 1, wherein the transport body is fixed to the chassis by at least one of a retractable fastening component and a rotatable fastening component.

10. The vehicle configurator according to claim 1 comprising a connection between the chassis and the transport body, for at least one of exchanging data and supplying power, wherein the connection is at least one of a cable connection and a wireless connection.

11. A chassis comprising one or more transfer component(s), wherein the transfer component(s) are arranged substantially in a sliding plane,
wherein the chassis is configured such that
a transport body is slidable in the sliding plane via the one or more transfer component(s) for at least one of loading and unloading the transport body from the chassis,
wherein the chassis is a road vehicle,
wherein the transfer component(s) are configured such that a sliding direction of the transport body is lateral to a longitudinal axis of the chassis,
wherein the chassis is configured for at least one of loading and or unloading the body along the sliding direction, and
wherein the chassis comprises a guide component for guiding the at least one transport body during sliding along the sliding direction.

12. A method for moving a transport body in a vehicle configurator, the vehicle configurator comprising
a chassis,
a transport body and
one or more transfer component(s), wherein the one or more transfer component(s) are at least one of substantially arranged in a sliding plane and forming the sliding plane,
wherein the chassis is a road vehicle,
wherein the transfer component(s) are configured such that a sliding direction of the transport body is lateral to a longitudinal axis of the chassis,
wherein the chassis comprises a guide component for guiding the at least one transport body during sliding along the sliding direction,
the method comprising the step of
sliding the transport body in the sliding plane via the one or more transfer component(s) for at least one of loading and unloading the transport body from the chassis along the sliding direction.

13. The vehicle configurator according to claim 1, wherein the vehicle is at least one of a roadworthy vehicle and an autonomous roadworthy vehicle.

14. The vehicle configurator according to claim 1, wherein the vehicle is a self-supporting rolling chassis.

15. The vehicle configurator according to claim 14, wherein the self-supporting rolling chassis is of a skateboard type.

16. The vehicle configurator according to claim 2, wherein a support surface of the chassis and a support surface of the station are substantially aligned in a plane.

17. The vehicle configurator according to claim 2, wherein a support surface of the chassis and a support surface of the station are spaced apart in Z-direction from one another by a distance in the range of at least between 1 to 20 cm.

18. The vehicle configurator according to claim 2, wherein a support surface of the chassis and a support surface of the station are spaced apart in Z-direction from one another by a distance in the range of at least between 1 to 5 cm.

* * * * *